(12) United States Patent
Zhang et al.

(10) Patent No.: US 8,294,794 B2
(45) Date of Patent: Oct. 23, 2012

(54) SHADOW REMOVAL IN AN IMAGE CAPTURED BY A VEHICLE-BASED CAMERA FOR CLEAR PATH DETECTION

(75) Inventors: Wende Zhang, Shelby Township, MI (US); Qi Wu, Pittsburgh, PA (US); Vijayakumar Bhagavatula, Pittsburgh, PA (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 12/830,525

(22) Filed: Jul. 6, 2010

(65) Prior Publication Data

US 2012/0008021 A1  Jan. 12, 2012

(51) Int. Cl.
*H04N 9/64* (2006.01)
(52) U.S. Cl. ........................................ 348/251
(58) Field of Classification Search .................... 348/251
See application file for complete search history.

(56) References Cited

U.S. PATENT DOCUMENTS

| | | | | |
|---|---|---|---|---|
| 5,592,567 | A * | 1/1997 | Kilger | 382/199 |
| 5,651,075 | A * | 7/1997 | Frazier et al. | 382/105 |
| 2006/0274917 | A1* | 12/2006 | Ng et al. | 382/103 |
| 2010/0097455 | A1 | 4/2010 | Zhang | |

OTHER PUBLICATIONS

Graham D. Finlayson, et al., Entropy Minimization for Shadow Removal, Klumer Academic Publishers, 2009.
Alverez, Jose; Lopez, Antonio,; Baldrich, Ramon: Shadow Resistent Road Segmentation from a Mobile Monocular System; Springer Berlin/Heidelberg; 2007; Lecture Notes in Computer Science; Pattern Recognition and Image Analysis; vol. 4478; Seiten 9-16; DOI:10.1007/978-3-540-72849-8_2.
Finlayson, G., Hordley, S., Lu, C., Drew, M.: "On the removal of shadows from images"; IEEE Trans. on Pattern Analysis and Machine Intelligence; Jan. 2006; vol. 28(1), Seiten 59-68, DOI: 10.1109/TPAI.2006.18.

* cited by examiner

*Primary Examiner* — James Hannett (57) ABSTRACT

A method for is provided for creating a shadow-reduced image from a captured image for distinguishing a clear path of travel. Each pixel of a captured input image is plotted according to a two dimensional logarithmic graph. A specific color set relating to an associated color value of a clear path. A linear illumination-invariant axis is determined as a function of the specific color set. An illumination direction for the linear illumination-invariant axis is determined. A log-chromaticity value of each plotted pixel of the specific color set is projected on the axis. Edges in the input image and the illumination-invariant image domain are identified. The identified edges of the input image are compared to identify edges in the illumination-invariant image domain. A determination is made whether a shadow edge is present in response to comparing the edges. A shadow-reduced image is generated for scene analysis by a vehicle vision-based system.

16 Claims, 6 Drawing Sheets

SHADOW REMOVAL IN AN IMAGE CAPTURED BY A VEHICLE-BASED CAMERA FOR CLEAR PATH DETECTION

BACKGROUND OF INVENTION

An embodiment relates generally to vision-based object detection systems.

Illumination conditions such as shadows can cause errors in the vision-based object detection systems. Shadows distort the color of a captured object resulting in ambiguities between (1) edges due to shadows and (2) edges between different entities (e.g., road and landscape). Applications have been used to filter out shadows but prior art systems assume the use of a camera having a high quality imager. Cameras with high quality imagers are expensive with large packaging sizes, and therefore, not practical especially in a mass-produced vehicle based vision system. With the use of high quality imager, the camera sensor is assumed to be narrow-banded and behave like Dirac delta functions in that they have a non-null response only at a single wavelength. However, a low cost imager typically used in vehicle vision based object detection systems does not conform to the narrow-band sensor assumption. Therefore, previous techniques for shadow removal are inapplicable with the use low cost production imagers.

SUMMARY OF INVENTION

An advantage of an embodiment is the reduction of shadows from an image captured by an image capture device that is to be analyzed by a vehicle-based vision sensing system. The shadow-reduction technique focuses on a specific color set of the road surface for performing shadow removal only from the specific color set. In addition, the selection of the linear illumination-invariant axis is generated so that the projected values along the illumination direction of the specific color sets are substantially separated from the other color sets of the image. Moreover, a target region is generated based on a vanishing point and vanishing line which targets a specific region of the image for performing the shadow-reduction technique as opposed to the entire image.

An embodiment contemplates a method for creating a shadow-reduced image from a captured image for distinguishing a clear path of travel. An input image of a scene is captured by an image capture device. Each pixel of the captured input image is plotted according to a two dimensional logarithmic graph. Each pixel is represented by a color value of one of a plurality of color sets in the logarithmic graph. A specific color set in the logarithmic graph is selected. The color set relates to associated color values of the road. A linear illumination-invariant axis is determined as a function of the specific color set. An illumination direction for the linear illumination-invariant axis is determined. The linear illumination-invariant axis extends in a direction that is substantially orthogonal to the illumination direction of the specific color set. A log-chromaticity value of each plotted pixel of the specific color set is projected on the linear illumination-invariant axis. Each plotted pixel on the linear illumination-invariant axis represents a color value of the respective pixels of the image mapped to an illumination-invariant image domain. Edges are identified in the input image. Edges in the illumination-invariant image domain are identified. The identified edges of the input image are compared to identify edges in the illumination invariant image domain. A determination is made whether a shadow edge is present in response to an edge identified in the input image and an absence of a correlating edge in the illumination invariant image domain. A shadow-reduced image is generated for scene analysis by a vehicle vision-based system.

DETAILED DESCRIPTION

Figure 1:
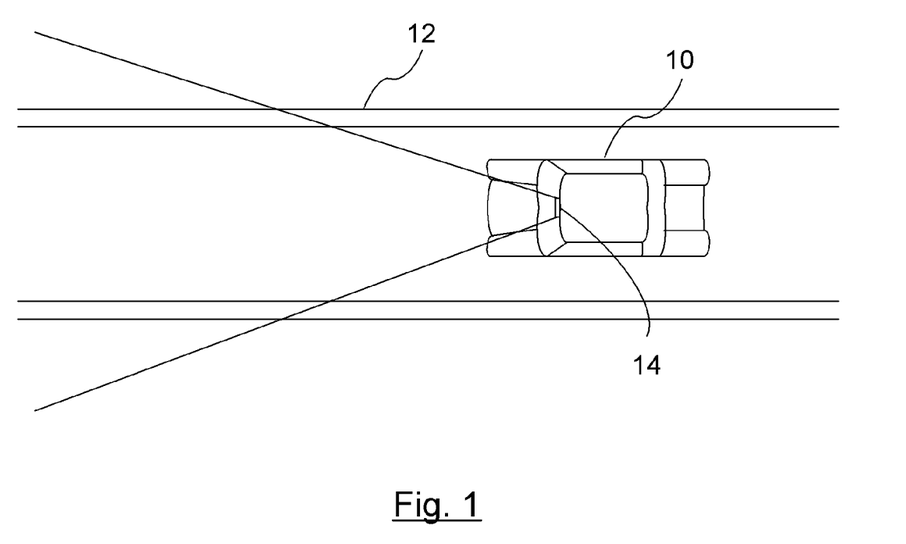
FIG. 1 is a plan view of a vehicle capturing an image of a road.

There is shown in FIG. 1, a vehicle 10 traveling along a road 12. A vision-based imaging device 14 captures images of the road forward of the vehicle 10 for detecting images in the feasible region of travel (hereinafter referred to as clear path). The vision-based imaging device 14 is used to detect objects. In a preferred embodiment, the vision-based imaging device 14 is used to identify the clear path or lane markings in the road for systems such as, but not limited to, lane departure warning systems. The vision-based imaging device 14 is preferably mounted in the interior of the vehicle just behind the windshield for capturing events occurring exterior and forward of the vehicle. Although the vision-based imaging device 14 may be used for a variety of functions (e.g., night vision enhancement for the driver), the primary purpose as described herein is for systems that require the recognition of road marking, lane markings, road signs, or other roadway objects. An example of such systems includes, but is not limited to, lane departure warning systems where it is imperative that the system is able to identify where the vehicle is in the roadway for alerting the driver of an unintended lane change.

Figure 2:
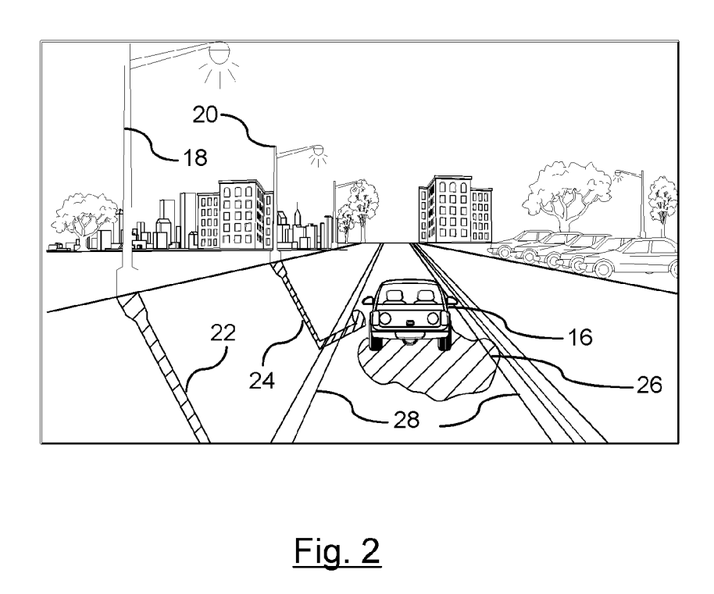
FIG. 2 is a captured image by a capture image device within a vehicle.

FIG. 2 illustrates an image captured by the vision-based imaging device on the vehicle. Depending on the brightness and angle of an illumination source, shadows may be cast on objects in the travel path of the vehicle thereby increasing the difficulty of the system to distinguish between an object on the road and a shadow cast on the road. As shown in FIG. 2, a vehicle 16 that is traveling in front of the driven vehicle in addition to light posts 18 and 20 may cast shadows 22, 24, and 26 in the roadway making recognition of lane markers 28 on the road difficult.

Figure 3:
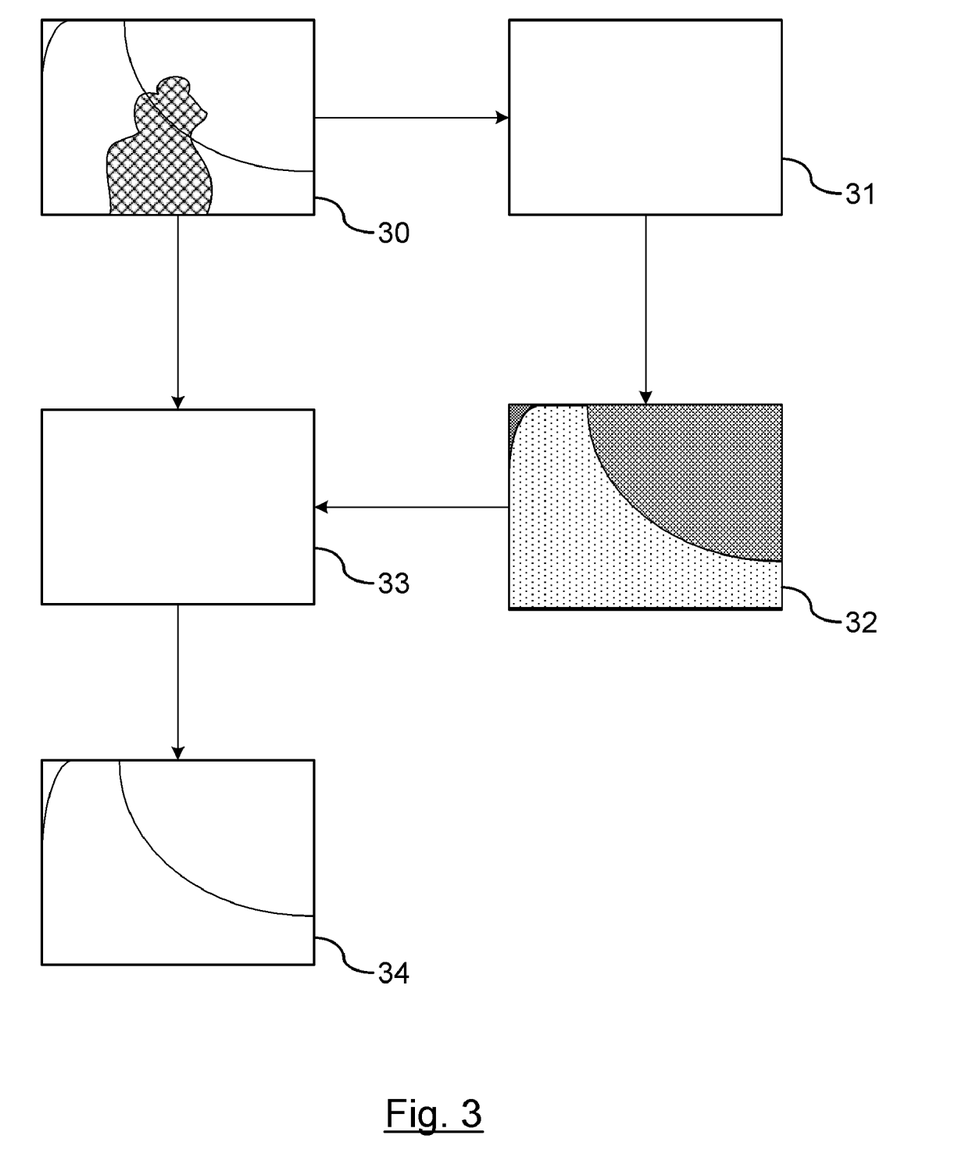
FIG. 3 is a block diagram of the shadow reduction process.

An exemplary graphical flow process approach for shadow removal is shown in FIG. 3. In block 30, an image containing a shadow is captured by the image capture device. The shadow is a self-shadow of the person operating the image capture device.

In block 31, an illumination-invariant analysis as will be described later is executed for detecting any shadows in the image. In block 32, the input image is represented in an illumination-invariant image domain. The image represented in the illumination-invariant image domain for graphical purposes is a grey-scale image where color sets are replicated regardless of the illumination conditions or shadows present in the input image. It should be understood that for the purposes of implementing this technique in a vehicle, an actual invariant image is not required to be generated; rather, mathematical analysis, modeling, or other representations may be used to model the image in the illumination-invariant image domain. As is shown, the shadow is removed from the illumination-invariant image domain as a result of the illumination-invariant analysis.

In block 33, the input image and the illumination-invariant image domain are compared for determining where shadows are present in the original input image for constructing a shadow-reduced image.

In block 34, the shadow is removed from the captured input image as a result of the comparison between the gradients of the original input image and the gradients of the illumination-invariant image domain.

Figure 4:
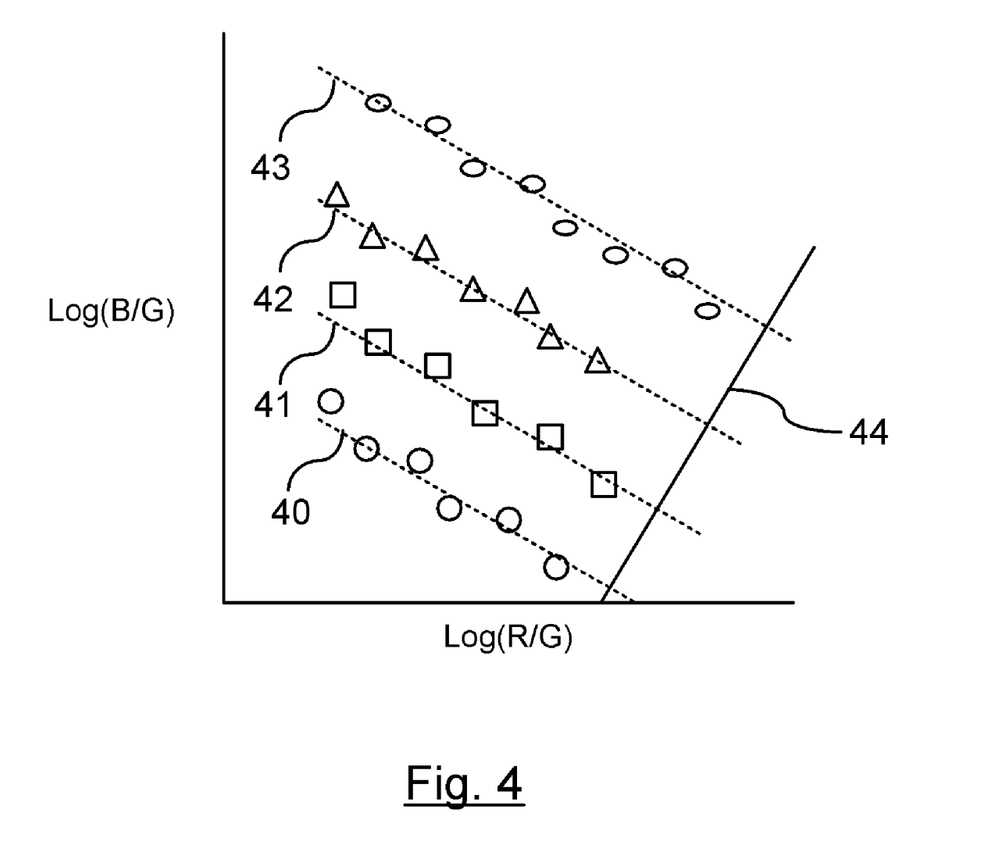
FIG. 4 is a graph of an illumination invariant plot using linear illumination-invariant axis.

FIG. 4 describes a mathematical approach to shadow removal which is described as follows. In object detection and classification for an on-road vehicle, the background and foreground of the captured image are constantly changing. For a single RGB (red, green, blue) image, cast shadows can be removed based on illumination-invariant analysis. If lighting is approximately a Planckian source having Lambertian surfaces imaged by three delta function type sensors, then chromaticity band-ratios (e.g., R/G, B/G for a color 3-band RGB image) may be formed. In addition, a straight line is formed for a log plot of two dimensional {log(R/G), log(B/G)} values for any color set under different lighting conditions. Moreover, every such line for each different color set has a same slope. Therefore, this physics-based concept can be used to derive an illumination-invariant image domain in which color values of a color set map to a same value in the illumination invariant image regardless of lighting conditions (i.e., whether shadows are present or not present).

In addition, object edges formed in the image correspond to changes in a material reflectance. Shadow edges are edges that are in the original image but are absent from an invariant image. A thresholding operation is defined on a gradient representation of the image to identify the shadow edge. Since the threshold shadow edges are noisy, morphological operations are applied to expand the edges and fill in some of the gaps in the shadow edges. Moreover, the identified shadow edges are set to zero for removing the effects of illumination changes. An integration step of each processed channel's gradient image is used to recover shadow-reduced images given up to multiplicative constants which are then estimated in order to obtain the final shadow-reduced color image.

The construction of the shadow-reduced invariant image is discussed herein. A graphical representation using grey-scale imaging is utilized. The technique uses a standard color image as the input whereas the output is a illumination-invariant representation of the image. The illumination-invariant image domain is obtained by projecting its log-chromaticity values on the illumination-invariant direction. To perform this projection, a Lambertian model is used for image formation. An assumption is made that if the surface appearance is equal and independent of the viewing direction (i.e., an ideal diffuse surface), a light source with a spectral power distribution (SPD):$E(\lambda)$ irradiating on this surface and incident on the camera sensors will lead to a response as follows:

$$R_k = \int_w E(\lambda)S(\lambda)Q_k(\lambda)d\lambda \qquad (1)$$

$$k = r, g, b$$

where $S(\lambda)$ represents the surface reflectance that is defined as the fraction of the incident light that is reflected on the per-wavelength basis, $E(\lambda)$, the SPD of the illuminant, defines the power emitted by the illuminant as a function of wavelength, $Q_k(\lambda)$ is the spectral sensitivity of the imaging device's $k^{th}$ sensor (where k=r, g, b) specifying the proportion of the light absorbed at each wavelength by the sensors. If the above terms are multiplied and integrated over w, the range of wavelengths to which the sensors have a non-zero response, it gives $R_k$ the color value at each pixel in the image.

In order to simplify eq. (1) and derive an invariant representation, aside from the Lambertian surface assumption, two other assumptions are utilized. First, an illumination source is assumed to obey Planck's black-body radiators law. Planck's black-body radiators law states that a perfect spherical radiator when heated at a temperature T emits electromagnetic radiations (e.g., shinings, glitterings) at specific wavelengths. Examples of Planckian light sources include the sun and the sky which are the illumination sources of most interest in our object detection and classification application. The illumination can then be parameterized by its color temperature T as:

$$E(\lambda) = Ic_1\lambda^{-5}e^{\frac{-c_2}{T\lambda}} \qquad (2)$$

where $c_1$ and $c_2$ are constants, and I is the overall intensity of the light.

The second assumption is that the camera sensors are assumed to be narrow-band and to behave like Dirac delta functions in that they have a non-null response only at a single wavelength $\lambda_k$. As a result, the camera sensitivities can be represented by the following equation:

$$Q_k(\lambda) = q_k\delta(\lambda - \lambda_k) \qquad (3)$$

where $\lambda_k$ is the only wavelength at which $Q_k$ has a non-null response. With these constraints, the original image formation can be expressed as:

$$R_k = Ic_1\lambda_k^{-5}e^{\frac{-c_2}{T\lambda_k}}S(\lambda_k)q_k. \qquad (4)$$

For any color in the image, the color may be derived by a combination of RGB color channels (e.g., i=red, blue) The band-ratio 2-vector chromaticity can be generated by dividing two color channels:

$$c_i = \frac{R_i}{R_p}, \qquad (5)$$

where p is fixed to one color channel (e.g., green), and i indexes over the other two channels (e.g., i=red, blue). The effect of the illumination intensity, I, is removed since it is a constant value at each pixel for all three color channels. Therefore, $c_i$ does not depend on the intensity and shading information. The logarithms may then be derived as follows:

$$\rho_i = \log(c_i) = \log\left(\frac{s_i}{s_g}\right) + \frac{e_i - e_g}{T}, \quad i = r, b. \quad (6)$$

$$\begin{bmatrix} \rho_r \\ \rho_b \end{bmatrix} = \begin{bmatrix} \log s_r - \log s_g \\ \log s_b - \log s_g \end{bmatrix} + T^{-1} \begin{bmatrix} e_r - e_g \\ e_b - e_g \end{bmatrix} \quad (7)$$

where $s_k = c_1 \lambda_k^{-5} S(\lambda_k) q_k$ and $$e_k = -\frac{c_2}{\lambda_k},$$

k=r,g,b.

Summarizing the above equation in vector form, the following vector is derived:

$$\bar{\rho} = \bar{s} + \frac{1}{T}\bar{e}. \quad (8)$$

where $\bar{s}$ is a 2-vector which depends on the surface being imaged and the camera, but is independent of the illuminant, $\bar{e}$ is a 2-vector which is independent of surface being imaged, but depends on the camera. As a result, the illumination color changes (i.e., T varies), and the log-chromaticity vector $\bar{\rho}$ for a given surface moves along a straight line, which starts from the point $\bar{s}$ and moves along the direction $\bar{e}$. Moreover, the direction of this straight line depends on properties of the camera, but is independent of the surface and the illuminant.

Eq. (8) also effectively shows that, for the same surface under various Planckian illuminants, the log-chromaticity values fall on a line with slope:

$$e = \begin{bmatrix} e_r - e_g \\ e_b - e_g \end{bmatrix}. \quad (9)$$

Projecting each log-chromaticity value on a direction perpendicular to the illumination slope gives a value in the corresponding image location that depends only on color reflectance which is substantially invariant to the illumination. The generated image is the illumination invariant image.

FIG. 4 shows the invariant image formation process. In FIG. 4, the image has log-chromaticity values for four different surfaces (i.e., color sets). This assumes that perfect narrow-band sensors are utilized under a range of Planckian illuminants. It is clear that the log-chromaticity values for each surface fall along the respective lines 40, 41, 42, and 43 in chromaticity space. These lines have direction e. A direction orthogonal to illumination direction is shown by a solid dark line 44 which is referred to as the illumination-invariant axis. Each log-chromaticity value for a given surface projects to a single point along this line regardless of the illumination under which it is viewed. These points represent the invariant image as defined above.

Once an invariant direction is found relative to the illumination direction of each of the color sets, given a new input image, all the pixels are converted into log-chromaticity space and projected onto the invariant direction.

The objective is to generate a color shadow-reduced image. The original input image which contains shadows was used to derive the shadow-reduced invariant image. The edges which correspond to a shadow can be identified by comparing edges of the original image to those derived from the invariant image. By thresholding the shadow edges and setting gradients of shadows in the original image to zero, gradients that include sharp changes due to illumination effects can be excluded. Lastly, integrating the threshold gradients results in a full-color shadow-reduced image. The following provides a detailed description of the process for obtaining the full-color shadow-reduced image.

The first step is to perform shadow edge mask extraction. The original image contains edges that are induced by surface and illumination transitions, but the invariant image only contains edges relevant to the reference changes of the captured surface that are not caused by the shadow. Therefore, edges of the original image are compared to those derived in the invariant image. A shadow edge is defined to be any edge in the original which is not in the invariant image, which corresponds to illumination changes only. Directional gradients $\nabla I_{orig}$ and $\nabla I_{inv}$ are calculated separately from the original image and invariant image. Two thresholds $t_1$ and $t_2$ are used to evaluate these two edge maps in order to determine the locations of where the original image has a strong edge, whereas the invariant image has a weak edge. A binary shadow edge is generated as:

$$q_s(x, y) = \begin{cases} 1 & \text{if } |\nabla I_{orig}| > t_1 \text{ and } |\nabla I_{inv}| < t_2 \\ 0 & \text{otherwise} \end{cases} \quad (10)$$

Alternatively, shadow edge mask extraction may be performed by comparing the norm difference of the respective gradients. A gradient norm is determined from the input image and a gradient norm is determined from the illumination-invariant image domain. A gradient difference is calculated by subtracting the gradient norm of the illumination-invariant image domain from the gradient norm of the input image. The gradient difference is compared to a threshold for determining whether a shadow edge is present.

An initial shadow edge mask that is first generated is imperfect in that the edge mask contains a number of spurious edges. As a result, a set of morphological operations (e.g., close and dilation operations) are utilized to refine the shadow edges for generating a final shadow edge mask.

The second step is to apply shadow-reduced image integration. Since the shadow edges on gradients correspond to the changing illumination, the shadow edges can be removed in the gradients of the original image by thresholding, which uses the shadow edge mask, as described above, to reduce the illumination effects. As a result, the threshold gradients yield the grayscale representation of one channel which is a shadow-reduced image. The final full-color shadow-reduced image is recovered by combining all the RGB channel grayscale shadow-reduced images. To perform this step, the shadows in the gradient of the original image are removed using the threshold function $T_s$.

$$T_s(\nabla I, q_s(x, y)) = \begin{cases} 0 & \text{if } q_s(x, y) = 1 \\ \nabla I & \text{otherwise} \end{cases} \quad (11)$$

When a shadow edge is identified, the gradients in the original image are set to zero indicating that there is no change of illumination at this point. After thresholding is applied, the gradients are obtained only where sharp changes are present due to the material changes. The gradient is now integrated in order to recover a shadow-reduced image I' which does not have a shadow. To accomplish this, Poisson equation is used for problem formulation as follows:

$$\nabla^2 I' = \operatorname{div}(T_s(\nabla I, q_s(x,y))). \tag{12}$$

On the left side of eq. (13), the Laplacian of the image is represented as follows:

$$\nabla^2 I' = \frac{\partial^2 I'}{\partial x^2} + \frac{\partial^2 I'}{\partial y^2}. \tag{13}$$

On the right side of eq. (13), the formula is represented as follows:

$$\operatorname{div}(T_s(\nabla I, q_s(x, y))) = \frac{\partial T_s(\nabla I, q_s(x, y))}{\partial x} + \frac{\partial T_s(\nabla I, q_s(x, y))}{\partial y}$$

Therefore, Poisson equation is solved with homogeneous Neumann boundary conditions so that the gradients at the boundary are set to zero. Solving the above equations for each of the three color channels separately derives an exemplary reconstructed gray-scale image for each channel but with some unknown multiplicative constants. Combining I' of all RGB channels together produces a color image where the shadows are removed. In addition, to rectify the unknown multiplicative factors and obtain more realistic image colors, a mapping is applied to each pixel that maps the brightest pixels (e.g. the mean of the top 5% of pixels ordered by intensity) in the recovered image to the corresponding pixels in the original image. In practice, each pixel is assigned a projection value after a pixel is projected onto the illumination-invariant axis.

The process as described above successfully removes shadows when a high-quality imaging device is used. However, considering the cost of incorporating a high-quality imaging device in a vehicle, a more likely scenario is the use of low-cost product camera for object detection and classification. The problem is that the low-cost product camera does not satisfy the narrow-band assumption as the low-cost product camera causes a divergence in the log-chromaticity lines. Moreover, it is impossible to determine the invariant image since no invariant direction can be found. The following paragraphs describe processes for adapting the low-cost product camera to improve the performance of shadow removal for object detection and classification.

Figure 5:
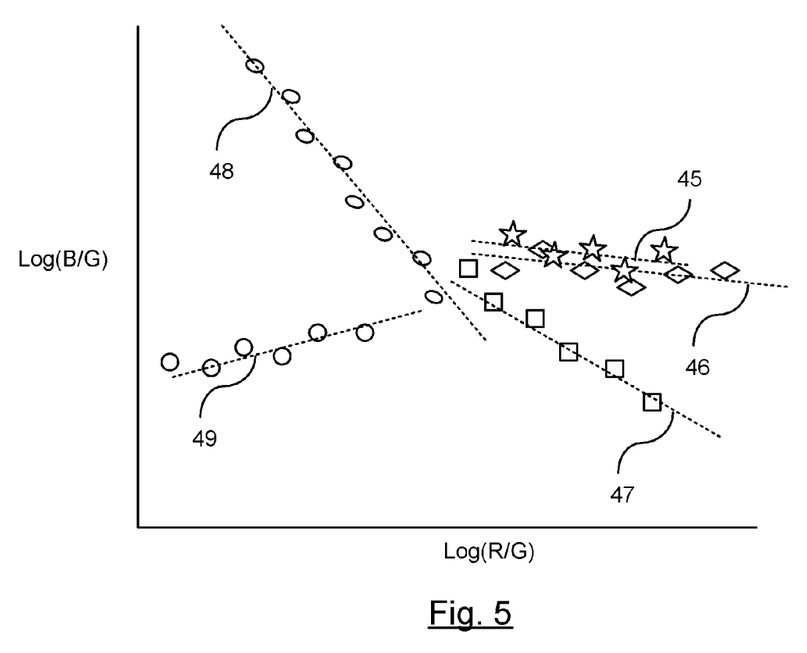
FIG. 5 is an exemplary illumination-invariant plot using a low quality image capture device.

In the previous paragraphs, the shadow-removal approach projected the log-chromaticity values of different color sets to a linear space to minimize the variance within each projected color set under various lighting conditions. However, as shown in FIG. 5, for a low-cost production camera, the values on a log-log space are divergent. Each of the pixels of the captured input image are plotted on the two dimensional logarithmic graph. Each pixel represents a respective color value in the logarithmic graph. The image shows log-chromaticity values for five different color sets. Each color value is represented by a respective shape on the graph. An illumination direction is generated for each color set as shown generally at 45-49. As stated earlier, the values on a log-log space are divergent and no linear illumination-invariant projection exists that is orthogonal to all of the illumination directions 45-49.

Figure 6:
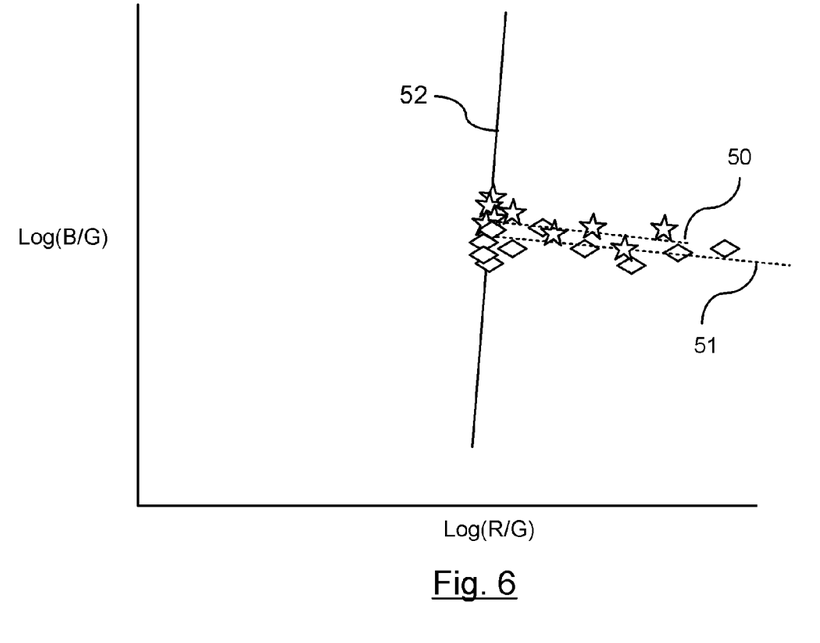
FIG. 6 is an exemplary illumination-invariant plot for a clear path color set according to a first embodiment.

FIG. 6 is a logarithmic graph that illustrates shadow removal when shadows are only from the clear path. The objective is to focus only on the clear path of travel. This technique is performed by identifying only the invariance direction of one or more color sets of the clear path surface without considering other color sets in the image. In FIG. 6, only the color sets of a first clear path scene 50 and a second clear path scene 51 are used to project onto the linear illumination invariant axis 52. All non-clear path scenes (e.g., invariance directions 47-49 shown in FIG. 5) are not utilized. It should be understood that other images may have more or fewer clear path color sets than illustrated herein. Since the focus is only on the road surface (i.e., clear paths), shadows cast on other non-road surface objects (i.e., non-clear paths) are essentially ignored. When images are sampled for bright regions and shadow regions of a road surface separately using a log chromaticity plot, the results show that different road scenes have very similar light directions. Moreover, the relative invariance directions perpendicular to these respective light directions for the specific color set (i.e., of the clear path surfaces) are similar with very small variations. An average can be defined to be the invariance direction for the clear path color set which may include various road surfaces. Therefore, each color variation of the specific color set that projects on to the illumination invariance axis can preserve the color chromaticity while removing the lighting influence (FIG. 6). As a result, shadow edges can be readily identified utilizing the linear illumination-invariant axis technique since only the specific color set of the road surface is examined for shadows.

After the color chromaticity values are projected onto the illumination invariance axis and an image is represented in the illumination-invariant image domain, a gradient of the edges in the illumination-invariant image domain is calculated by an operator that includes, but is not limited to a Sobel operator. Moreover, a gradient of the input image is obtained by the Sobel operator.

A gradient difference image (i.e., the gradient difference between the gradient of the input image and the gradient of the illumination-invariant image domain) is calculated by subtracting a gradient norm of the illumination-invariant image domain from a gradient norm of the input image. The gradient difference image is thresholded to generate the shadow edge map. For each gradient difference value, if the respective value is larger than a predetermined threshold, it is assumed to be a shadow edge. After removing the shadow edge from the gradient of the input image in the RGB color channels, updated gradients are re-integrated in the color image of each color channel and combined as a shadow reduced image. As a result, the shadow edge can be readily obtained by only focusing on a color set of only the clear path surface.

Figure 7:
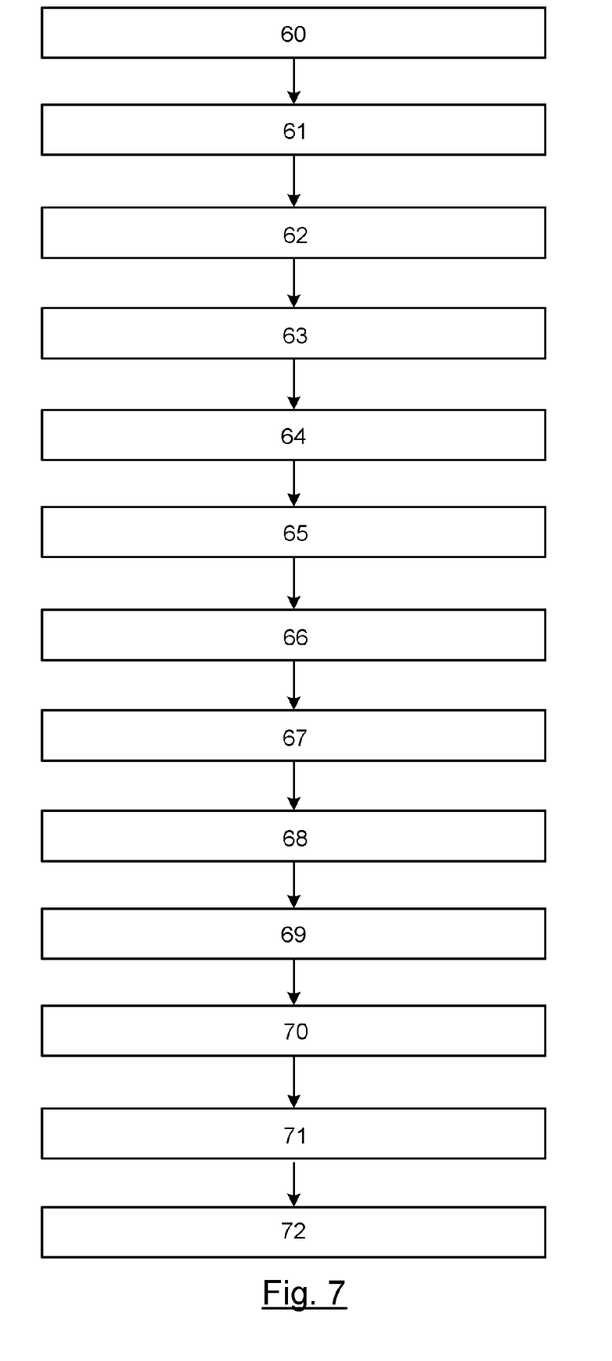
FIG. 7 is a flowchart for a method for reducing a shadow from a captured image according to the first embodiment.

FIG. 7 is a flowchart for a method for reducing a shadow from a captured image. In step 60, an input image is captured of a scene exterior of a vehicle by an image capture device. The image capture device captures images in color.

In step 61, each pixel <R, G, B> of the captured input image is plotted on a two dimensional logarithmic graph.

In step 62, a specific color set or color sets relating to associated color values of the path of travel (clear path) are selected in the logarithmic graph.

In step 63, a linear illumination-invariant axis is determined. The linear illumination-invariant axis can be identified in an offline process utilizing pre-recorded color samples under various lighting conditions. The linear illumination-invariant axis selected may be previously identified in an offline process as a respective axis will always be common to a respective set of clear path color sets.

In step 64, illumination directions for each of the clear path color sets are determined. The illumination directions are orthogonal to the linear illumination-invariant axis at each point of intersection.

In step 65, a log-chromaticity value of each plotted pixel is projected onto the linear illumination-invariant axis.

In step 66, a representation of the input image in the illumination-invariant image domain is provided utilizing the projection values of each plotted pixel of the specific color set projected on the linear illumination-invariant axis. Each color value projected on the linear illumination-invariant axis represents a respective pixel of the invariant image in the illumination-invariant image domain.

In step 67, gradients of the edges in the illumination-invariant image domain and gradients of the edges in the input image are calculated by an operator that includes, but is not limited to, a Sobel operator.

In step 68, shadow edges are identified in both the gradient of the input image and the gradient of the illumination-invariant image domain. The shadow edges may be identified by determining the gradients of the original image and the invariant image and then comparing the respective gradients to two respective thresholds. Alternatively, the shadow edges may be identified by determining gradient norms from the illumination-invariant image domain and the input image, determining a gradient difference between the two norms, and then comparing the gradient difference to a single threshold.

In step 69, for shadow edges that have been successfully identified, the gradients in the original image are set to zero indicating that there is no change of illumination at this location. This thresholding step obtains gradients where sharp changes in the image are due only to material changes as there are no sharp edges due to illumination changes.

In step 70, the gradient of each channel (i.e., RGB) is integrated for reconstructing a grayscale image for each channel.

In step 71, all the channels are combined for forming a color image where shadows are significantly reduced or removed.

In step 72, the shadow-reduced image is generated for scene analysis by a vehicle-based vision system. If a determination is made that no shadows were present, then the original input image is used by the vehicle-based vision system for scene analysis.

Figure 8:
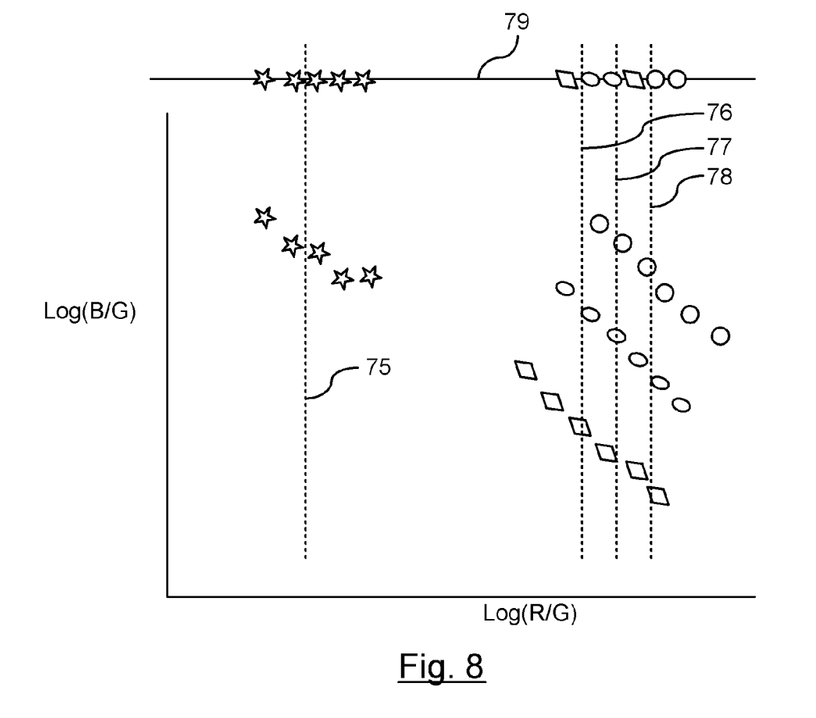
FIG. 8 is an exemplary illumination-invariant plot for a clear path color set according to a second embodiment.

FIG. 8 represents an embodiment utilizing a color variation of a specific color set (e.g., clear path) that substantially distinguishes itself from the other color sets. For example, an objective is to cluster color features of the clear path to a simple representation under various lighting conditions. At a same time, the emphasis is to preserve the difference between clear path colors and all other colors after projection. Therefore, in order to remove the shadows in clear path regions for clear path detection, it is not necessary to differentiate among the projected color sets to remove shadows in the other regions, which are not color sets of the clear path class. In FIG. 8, a clear path color set is shown at 75 and non-clear path color sets are shown at 76, 77, and 78. A binary object (color) classification problem is formulated in the machine learning field. An attempt is made to find a projection 79 that will cluster the features of a clear path color set and separate the different colors of other non-clear path color sets. FIG. 8 provides an invariance axis projection which not only minimizes the variance of the color projections under various lighting conditions, but also maximizes the projected distances between the clear path color set projection and the non-clear path color set projections. A few existing machine learning algorithms can achieve this objective, such as, (1) Two-Class Linear Discriminate Analysis (LDA) which minimizes intra-variations of classes while maximizng inter-variations, (2) Support Vector Machine (SVM), which maximizes the margin between two classes, and (3) Symmetric Maximization of the Minimal distance in Subspace (SMMS), which minimizes the clear path color projection variation, while maximizing the minimal distance between two classes (clear path vs. non-clear path). As a result, a shadow-reduced region in clear path regions can be robustly identified on the log-chromaticity space since the color projection values of clear path regions are substantially spaced from all the other color sets to reduce any color confusion. Color confusion is an overlapping of pixels of different color variations on the illumination invariance after projection. The overlapping of the pixels on the illumination-invariant axis makes it indistinguishable in the invariant domain due to the lack of separation.

Support vector machines (SVMs) include a set of related learning algorithms used for classification and regression. The learning algorithms are training methods that build models used to predict whether a new sample falls into one category or another category. The SVM model is a representation of categories of points in space and mapped so that the separate categories are divided by a clear gap. New samples are then mapped into the same space and predicted to belong to a category based on which side of the gap they reside. Moreover, the SVM constructs a hyperplane or set of hyperplanes in a high dimensional space, which can be used for classification, regression or other tasks. A good separation is desired by the hyperplane that has the largest spatial distance to the nearest training datapoints of any class. The larger the spatial separation distance is, the lower the generalization errors of the classifier are.

The flowchart as shown in FIG. 7 would apply to the technique shown in FIG. 8 except for the following steps. In step 62, all pixels of each color set are selected in the logarithmic graph. In step 63, binary object classification utilizing machine learning techniques provides an invariance axis projection that minimizes the variance of color projections under various conditions within the clear path color set, but also maximizes the projected distances between the clear path color set projections and the non-clear path color set projections. In step 64, the illumination directions for the clear path color sets as well as the non-clear path color sets are determined. Each of the clear path and non-clear path illumination directions are orthogonal to the linear illumination-invariant axis.

Figure 9:
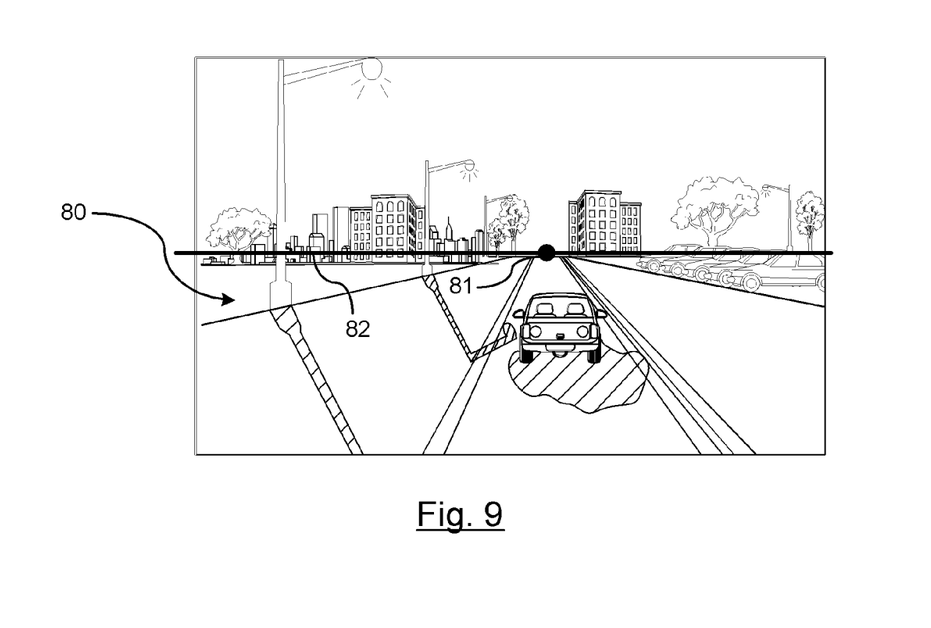
FIG. 9 is exemplary image utilizing a target region technique according to a third embodiment.

FIG. 9 illustrates an embodiment that focuses the clear path analysis on a particular region of the image thereby reducing the overall computational time for scene applied. In FIG. 9, a target region 80 is determined of which the clear path detection is analyzed. That is, only the target region is analyzed for determining whether shadow is present as opposed to viewing the entire input image. The target region may be utilized in cooperation with either of the embodiments described above. To determine a target region, a vanishing point 81 within the image is determined. Determining a vanishing point is described in co-pending application Ser. No. 12/581,659 filed on Oct. 19, 2009 which is incorporated by referenced in its entirety. Once the vanishing point 81 is determined, a vanishing line 82 is determined. The vanishing line 82 extends horizontally across the input image extending through the vanishing point. Prior to generating a vanishing line 82, calibration of the image may be performed by determining whether the capture input device is level. This may be executed by capturing images upon a powering up of the capture input device and verifying whether the capture image is skewed or level. Once the vanishing line 82 is established, a region only below the vanishing line (i.e., target region) is analyzed for shadow detection. The method of utilizing the vanishing line may be utilized with either method described herein.

While certain embodiments of the present invention have been described in detail, those familiar with the art to which this invention relates will recognize various alternative designs and embodiments for practicing the invention as defined by the following claims.

What is claimed is:

1. A method for creating a shadow-reduced image from a captured image for distinguishing a clear path of travel, the method comprising the steps of:
   (a) capturing an input image of a scene by an image capture device;
   (b) plotting each pixel of the captured input image according to a two dimensional logarithmic graph, each pixel being represented by a color value of one of a plurality of color sets in the logarithmic graph;
   (c) selecting a specific color set in the logarithmic graph, the color set relating to associated color values of the road;
   (d) determining a linear illumination-invariant axis as a function of the specific color set;
   (e) determining an illumination direction for the linear illumination-invariant axis, the linear illumination-invariant axis extending in a direction that is substantially orthogonal to the illumination direction of the specific color set;
   (e) projecting a log-chromaticity value of each plotted pixel of the specific color set on the linear illumination-invariant axis, wherein each plotted pixel on the linear illumination-invariant axis represents a color value of the respective pixels of the image mapped to an illumination invariant image domain;
   (f) identifying edges in the input image;
   (g) identifying edges in the illumination-invariant image domain;
   (h) comparing the identified edges of the input image to identify edges in the illumination invariant image domain;
   (i) determining whether a shadow edge is present in response to an edge identified in the input image and an absence of a correlating edge in the illumination-invariant image domain; and
   (g) generating a shadow-reduced image for scene analysis by a vehicle vision-based system.

2. The method of claim 1 further comprising the steps of:
   determining a vanishing point in the image;
   determining a vanishing line extending horizontally through the vanishing point in the image;
   identifying a target region below the vanishing line; and
   performing steps (c)-(g) only on the target region.

3. The method of claim 1 wherein other color sets are projected onto the linear illumination-invariant axis, and wherein step (d) further includes selecting the linear illumination-invariant axis that provides a substantial separation of distance between the specific color set and other color sets projected onto the illumination-invariant axis.

4. The method of claim 3 wherein the selecting the linear illumination-invariant axis substantially minimizes a distance between the projected color values within the specific color set.

5. The method of claim 4 wherein the step of selecting the linear illumination-invariant axis includes selecting a linear illumination-invariant axis that scatters the projected color values of other color sets.

6. The method of claim 4 wherein the selecting the linear illumination-invariant axis includes selecting a linear illumination-invariant axis that provides a substantial distance between the specific color set and other color sets.

7. The method of claim 3 further comprising the steps of:
   determining a vanishing point in the image;
   determining a vanishing line extending horizontally through the vanishing point in the image;
   identifying a target region below the vanishing line; and
   performing steps (c)-(g) only on the identified target region.

8. The method of claim 3 wherein step (d) further includes selecting the linear illumination-invariant axis that substantially clusters the color values of the specific color set and substantially scatters the colors values of the other color sets.

9. The method of claim 8 further comprising the steps of:
   determining vanishing point in the image;
   determining a vanishing line extending through the vanishing point in the image;
   identifying a target region below the vanishing line; and
   performing steps (c)-(g) on the identified target region.

10. The method of claim 1 wherein the logarithmic graph includes a logarithmic blue-green axis and a logarithmic red-green axis.

11. The method of claim 1 wherein identifying edges in the input image and the illumination-invariant image domain further comprises the steps of:
    determining a directional gradient from the input image;
    determining a directional gradient from the illumination-invariant image domain;
    comparing the directional gradient of the input image and the directional gradient of the illumination-invariant image domain to at least one threshold for determining whether a shadow edge is present.

12. The method of claim 11 wherein comparing the directional gradient of the input image and the directional gradient of the illumination-invariant image domain to at least one threshold further comprises:
    determining whether the directional gradient of the input image is greater than a first threshold;
    determining whether the directional gradient of the illumination-invariant image domain is less a second threshold.

13. The method of claim 11 wherein comparing the directional gradient of the input image and the directional gradient of the illumination-invariant image domain to at least one threshold further comprises:
    calculating a gradient difference between the directional gradient of the input image and the directional gradient of the illumination-invariant image domain;
    comparing the gradient difference to the at least one threshold.

14. The method of claim 13 wherein calculating a gradient difference comprises the following steps:
    determining a gradient norm of the input image;
    determining a gradient norm of the illumination-invariant image domain;
    calculating the gradient difference by subtracting the gradient norm of the illumination-invariant image domain from the gradient norm of the input image.

15. The method of claim 1 wherein the linear illumination-invariant axis is selected utilizing a machine learning technique.

16. The method of claim 15 wherein the machine learning technique includes a linear discriminant analysis.

* * * * *